(12) United States Patent
Guerin Araujo Da Silva et al.

(10) Patent No.: US 9,705,133 B2
(45) Date of Patent: Jul. 11, 2017

(54) USE OF SUBFLUORINATED CARBON NANO-OBJECTS AS AN ELECTRODE MATERIAL OF PRIMARY LITHIUM BATTERIES WITH STRONG CAPABILITIES

(71) Applicant: UNIVERSITE BLAISE PASCAL-CLERMONT-FERRAND II, Clermont-Ferrand (FR)

(72) Inventors: Katia Guerin Araujo Da Silva, Pont-du-Chateau (FR); Marc Denis Alphonse Dubois, Metz (FR); Andre Hamwi, Clermont-Ferrand (FR)

(73) Assignee: UNIVERSITE BLAISE PASCAL-CLERMONT-FERRAND II, Clermont-Ferrand (FR)

( * ) Notice: Subject to any disclaimer, the term of this patent is extended or adjusted under 35 U.S.C. 154(b) by 153 days.

(21) Appl. No.: 14/651,681

(22) PCT Filed: Dec. 11, 2013

(86) PCT No.: PCT/IB2013/060805
§ 371 (c)(1),
(2) Date: Oct. 19, 2015

(87) PCT Pub. No.: WO2014/091422
PCT Pub. Date: Jun. 19, 2014

(65) Prior Publication Data
US 2016/0072130 A1    Mar. 10, 2016

(30) Foreign Application Priority Data

Dec. 12, 2012 (FR) .................................... 12 61927

(51) Int. Cl.
*H01M 4/13* (2010.01)
*H01M 4/583* (2010.01)
(Continued)

(52) U.S. Cl.
CPC ........... *H01M 4/5835* (2013.01); *H01M 4/04* (2013.01); *H01M 4/06* (2013.01); *H01M 4/08* (2013.01);
(Continued)

(58) Field of Classification Search
CPC .......... H01M 4/366; H01M 4/06; H01M 6/14; H01M 4/623; H01M 4/08; H01M 4/04; H01M 4/5835; H01M 2004/028
(Continued)

(56) References Cited

U.S. PATENT DOCUMENTS

2007/0231696 A1* 10/2007 Yazami ................. B82Y 30/00
429/231.7

FOREIGN PATENT DOCUMENTS

WO    2007098369 A2    8/2007
WO    2007098478 A2    8/2007
WO    2007126436 A2    11/2007

OTHER PUBLICATIONS

Ahmad Yasser et al. "The synthesis of multilayer graphene materials by the fluorination of carbon nanodiscs/nanocones", Carbon, Elsevier, Apr. 9, 2012; vol. 50, No. 10, pp. 3897-3908 XP028509431.

(Continued)

*Primary Examiner* — Gary Harris
(74) *Attorney, Agent, or Firm* — Cantor Colburn LLP

(57) ABSTRACT

The invention relates to the use of subfluorinated carbon nano-objects as an electrode material of primary lithium batteries, the electrode obtained by that use and a lithium battery comprising such an electrode. The subfluorinated carbon nano-objects used in the invention have a central part made of nonfluorinated carbon and a peripheral part made of fluorinated carbon of formula $CF_x$ where x represents the F/C atomic ratio, which is such that $0.25<x<1.1$ and whereof (Continued)

the spectrum $^{19}$F MAS RMN has a single peak between −150 and −190 ppm/CFCl$_3$ (outside of rotation bands). The invention applies to the field of storing and retrieving energy, in particular.

17 Claims, 11 Drawing Sheets

(51) Int. Cl.
*H01M 4/36* (2006.01)
*H01M 6/14* (2006.01)
*H01M 4/04* (2006.01)
*H01M 4/06* (2006.01)
*H01M 4/08* (2006.01)
*H01M 4/62* (2006.01)
*H01M 4/02* (2006.01)
*B82Y 30/00* (2011.01)
*B82Y 40/00* (2011.01)

(52) U.S. Cl.
CPC ........... *H01M 4/366* (2013.01); *H01M 4/623* (2013.01); *H01M 6/14* (2013.01); *B82Y 30/00* (2013.01); *B82Y 40/00* (2013.01); *H01M 2004/028* (2013.01); *Y10S 977/734* (2013.01); *Y10S 977/749* (2013.01); *Y10S 977/752* (2013.01); *Y10S 977/846* (2013.01); *Y10S 977/948* (2013.01)

(58) Field of Classification Search
USPC ...................................................... 429/231.7
See application file for complete search history.

(56) References Cited

OTHER PUBLICATIONS

International Search Report issued Mar. 21, 2014 re: Application No. PCT/IB2013/060805.
W Zhang et al. "Effect of graphitization on fluorination of carbon nanocones and nanodiscs", Carbon, Elsevier, Jun. 6, 2009, vol. 47, No. 12, pp. 2763-2775.

\* cited by examiner

USE OF SUBFLUORINATED CARBON NANO-OBJECTS AS AN ELECTRODE MATERIAL OF PRIMARY LITHIUM BATTERIES WITH STRONG CAPABILITIES

TECHNICAL FIELD

The invention relates to the use of subfluorinated carbon nano-objects as electrode material of primary lithium batteries having a capacity greater than the theoretical capacity, to the electrode obtained by this use and to a lithium battery comprising such an electrode.

BACKGROUND

Numerous research studies have been carried out on improving the performance of primary lithium batteries.

Some of these research studies have been directed at the composition of the electrodes of such batteries, in particular the cathode.

Thus, primary lithium batteries comprising a manganese oxide cathode have an energy density of 150 to 330 Wh·kg⁻¹, lithium batteries with an electrode making it possible to release $SO_2$ have an energy density of 150 to 315 Wh·kg⁻¹ and lithium batteries having an $SOCl_2$ electrode have an energy density of 220 to 560 Wh·kg⁻¹.

Finally, lithium batteries with an electrode made of fluorinated carbon of formula $CF_x$, with x representing the F/C molar ratio varying between 0.5 and 1.2, have an energy density of 260 to 780 Wh·kg⁻¹.

The fluorinated carbons having the composition $CF_1$ can deliver a theoretical capacity of 865 mAh·g⁻¹ when they are used as primary lithium battery electrode material. The increase in content of fluorine above $CF_1$ ($CF_{1.2}$) is not beneficial for the capacity due to the creation of electrochemically inactive $CF_2$ and $CF_3$ groups.

This theoretical capacity corresponds to the electrochemical conversion of every C—F bond.

This is because, within the primary lithium battery, the electrochemical process in a fluorinated carbon ($CF_x$) electrode involves the cleavage of the C—F bond by contributing an electron from the external circuit. The fluoride ion then formed combines with a lithium ion originating from the electrolyte to form LiF.

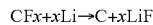

This reaction is irreversible. In order to obtain the maximum capacity (or amount of current, for the battery), the strategy has thus for a long time consisted in choosing a fluorinated carbon exhibiting the highest possible degree of fluorination, that is to say a $CF_1$ composition (each carbon atom is bonded to a fluorine), indeed even $CF_{1.1-1.2}$ composition (for compounds which are weakly organized structurally, such as petroleum cokes with small sizes of graphite sheets, $CF_2$ and $CF_3$ groups may be formed during the fluorination). This strategy exhibits a major disadvantage, the insulating nature of the highly fluorinated $CF_x$, which generates excess voltages in the battery and lowers the Faraday efficiency (the ratio of the experimental capacity to the theoretical capacity).

Furthermore, Yasser Ahmad et al. have described, in "The synthesis of multilayer graphene materials by the fluorination of carbon nanodiscs/nanocones", Carbon, 50 (2012), 3897-3908, subfluorinated carbon multisheet nanomaterials obtained by the "subfluorination" process.

This process is characterized by two essential points: the starting material is a nanomaterial and the fluorination is a subfluorination (a portion of the carbon atoms remains nonfluorinated) obtained either by direct fluorination with molecular fluorine ($F_2$) or by controlled fluorination using a solid fluorinating agent $TbF_4$.

BRIEF SUMMARY

In the invention, the materials thus obtained will be known as "subfluorinated carbon nano-objects".

In point of fact, the inventors have now discovered that, surprisingly, these subfluorinated carbon nanomaterials have a capacity, when used as primary lithium battery electrode, which is greater than the theoretical limit of 865 mAh·g⁻¹.

Thus, the invention provides for the use of subfluorinated carbon nano-objects comprising a central part made of nonfluorinated carbon and a peripheral part made of fluorinated carbon of formula $CF_x$, where x represents the F/C atomic ratio and is such that $0.25<x<1.1$, the ¹⁹F MAS NMR spectrum of which exhibits a single peak between −150 and −190 ppm, for the manufacture of electrodes of primary lithium batteries having a capacity ($C_{exp}$) greater than the theoretical capacity ($C_{theo}$) of the nanoobject, i.e. a ratio $C_{exp}/C_{theo}>1$.

The peak between −150 and −190 ppm is related to the covalent C-F bonds and the reference is $CFCl_3$. A single peak is understood to mean that the rotational bands are not taken into account.

In a first embodiment, the nano-objects are a stack of subfluorinated carbon nanodisks with a thickness, for the total stack, of between 12 and 123 nm, preferably with a thickness of 62 nm, and with a diameter of between 0.6 and 2.8 μm, preferably of 1.5 μm, the central nanodisks of which made of nonfluorinated carbon represent from 6 to 14% by volume of the total volume of the stack of subfluorinated carbon nanodisks and the electron paramagnetic resonance spectrum of which exhibits 7 signals between 3200 and 3800 G (Gauss) in the X band. This spectrum is recorded at a frequency of approximately 9.8 GHz. These signals characterize a superhyperfine structure between the electron (pendant bond) and 6 neighboring ¹⁹F nuclei at equal distances (arranged in the fluorinated part). An individual disk is composed of a disk-shaped graphene plane. The stack of disks is known as nanodisks.

In another embodiment, the nano-objects are double-walled subfluorinated carbon nanotubes made of subfluorinated carbon with a diameter of between 1 and 2.7 nm and with a length ranging from 5 to 20 μm, the central nanotube of which made of nonfluorinated carbon represents from 45 to 65% by volume, preferably 60% by volume, of the total volume of the nanotubes and the ¹³C MAS NMR spectrum of which exhibits a band at 120 ppm. This band is positioned at 120 ppm taking tetramethylsilane (TMS) as reference. The rotational bands are not taken into account. The band at 120 ppm is related to the carbon of the central nonfluorinated tube.

In yet another embodiment, the nano-objects are multi-walled nanotubes made of subfluorinated carbon with a diameter of between 1.8 and 54 nm and with a length ranging from 5 to 20 μm, the central part of which made of nonfluorinated carbon represents from 3 to 60% by volume of the total volume of the multi-walled nanotubes, comprising less than 30 walls, and the ¹³C MAS NMR spectrum of which exhibits a band at 120 ppm. This band is positioned at 120 ppm taking TMS as reference. The rotational bands are not taken into account. The band at 120 ppm is related to the central nonfluorinated tube(s).

In still another embodiment, the nano-objects are micrometric grains, the greatest dimension of which is between 1 and 10 µm, made of subfluorinated carbon with a graphite crystalline structure, the central part of which made of nonfluorinated carbon represents from 0.8 to 30% by volume of the total volume of the grain and the electron paramagnetic resonance spectrum of which exhibits 7 signals between 3200 and 3800 G in the X band. The spectrum is recorded at a frequency of approximately 9.8 GHz.

These micrometric grains admittedly have a dimension which can be greater than 1000 nm but they will also be known as "nano-objects" here as their use in an electrode material also makes it possible to obtain an excess capacity of the batteries in which these electrodes are incorporated.

In a final embodiment, the nano-objects are chosen from:
a stack of subfluorinated carbon nanodisks with a diameter of between 0.6 and 2.8 µm, preferably with a diameter of 1.5 µm, and with a thickness (for the total stack) of between 12 and 123 nm, preferably with a thickness of 62 nm, the central part of which made of nonfluorinated carbon represents from 6 to 14% by volume of the total volume of the stack of nanodisks (1a) and the electron paramagnetic resonance spectrum of which exhibits 7 signals between 3200 and 3800 G in the X band,
double-walled subfluorinated carbon nanotubes with a diameter of between 1 and 2.7 nm and with a length ranging from 5 to 20 µm, the central nanotube of which made of nonfluorinated carbon represents from 45 to 65% by volume, preferably 60% by volume, of the total volume of the nanotubes and the $^{13}C$ MAS NMR spectrum of which exhibits a band at 120 ppm,
multi-walled subfluorinated carbon nanotubes with a diameter of between 1.8 and 54 nm and with a length ranging from 5 to 20 µm, the central nanotube of which made of nonfluorinated carbon represents from 3 to 60% by volume of the total volume of the multi-walled nanotubes, comprising less than 30 walls, and the $^{13}C$ MAS NMR spectrum of which exhibits a band at 120 ppm,
micrometric grains, the greatest dimension of which is between 1 and 10 µm, made of subfluorinated carbon with a graphite crystalline structure, the central part of which made of nonfluorinated carbon represents from 0.8 to 30% by volume of the total volume of the grain and the electron paramagnetic resonance spectrum of which exhibits 7 signals between 3200 and 3800 G in the X band, and
the mixtures of two or more of these.

The invention also provides a lithium battery electrode, characterized in that it comprises subfluorinated carbon nano-objects comprising a central part made of nonfluorinated carbon and a peripheral part made of fluorinated carbon of formula $CF_x$, where x represents the F/C atomic ratio and is such that $0.25<x<1.1$, the $^{19}F$ NMR spectrum of which exhibits a single peak between −150 and −190 ppm.

In a first embodiment, the nano-objects are a stack of subfluorinated carbon nanodisks with a thickness, for the total stack, of between 12 and 123 nm, preferably with a thickness of 62 nm, and with a diameter of between 0.6 and 2.8 µm, preferably of 1.5 µm, the central nanodisks of which made of nonfluorinated carbon represent from 6 to 14% by volume of the total volume of the stack of nanodisks and the electron paramagnetic resonance spectrum of which exhibits 7 signals between 3200 and 3800 G in the X band.

In a third embodiment, the nano-objects are double-walled subfluorinated carbon nanotubes with a diameter of between 1 and 2.7 nm and with a length ranging from 5 to 20 µm, the central nanotube of which made of nonfluorinated carbon represents from 45 to 65% by volume, preferably 60% by volume, of the total volume of the nanotubes and the $^{13}C$ MAS NMR spectrum of which exhibits a band at 120 ppm.

In a fourth embodiment, the nano-objects are multi-walled nanotubes made of subfluorinated carbon with a diameter of between 1.8 and 54 nm and with a length ranging from 5 to 20 µm, the central part of which made of nonfluorinated carbon represents from 3 to 60% by volume of the total volume of the multi-walled nanotubes, comprising less than 30 walls, and the $^{13}C$ MAS NMR spectrum of which exhibits a band at 120 ppm.

In a fifth embodiment, the nano-objects are micrometric grains, the greatest dimension of which is between 1 and 10 µm, made of subfluorinated carbon with a graphite crystalline structure, the central part of which made of nonfluorinated carbon represents from 0.8 to 30% by volume of the total volume of the grain and the electron paramagnetic resonance spectrum of which exhibits 7 signals between 3200 and 3800 G in the X band.

In a sixth embodiment, the nano-objects are chosen from:
a stack of subfluorinated carbon nanodisks with a thickness of between 12 and 123 nm, preferably with a thickness of 62 nm, for the total stack, and with a diameter of between 0.6 and 2.8 µm, preferably of 1.5 µm, the central part of which made of nonfluorinated carbon represents from 6 to 14% by volume of the total volume of the stack of nanodisks and the electron paramagnetic resonance spectrum of which exhibits 7 signals between 3200 and 3800 G in the X band,
double-walled subfluorinated carbon nanotubes with a diameter of between 1 and 2.7 nm and with a length ranging from 5 to 20 µm, the central part of which made of nonfluorinated carbon represents from 45 to 65% by volume, preferably 60% by volume, of the total volume of the nanotubes and the $^{13}C$ MAS NMR spectrum of which exhibits a band at 120 ppm,
multi-walled subfluorinated carbon nanotubes with a diameter of between 1.8 and 54 nm and with a length ranging from 5 to 20 µm, the central part of which made of nonfluorinated carbon represents from 3 to 60% by volume of the total volume of the multi-walled nanotubes, comprising less than 30 walls, and the $^{13}C$ MAS NMR spectrum of which exhibits a band at 120 ppm,
micrometric grains, the greatest dimension of which is between 1 and 10 µm, made of subfluorinated carbon with a graphite crystalline structure, the central part of which made of nonfluorinated carbon represents from 0.8 to 30% by volume of the total volume of the grain and the electron paramagnetic resonance spectrum of which exhibits 7 signals between 3200 and 3800 G in the X band, and
the mixtures of two or more of these.

The invention also provides a lithium battery, characterized in that it comprises an electrode according to the invention or obtained by the use of subfluorinated carbon nano-objects according to the invention.

BRIEF DESCRIPTION OF THE DRAWINGS

The invention will be better understood and other characteristics and advantages of the invention will become more clearly apparent on reading the explanatory description which follows and which is made in reference to the figures, in which.

DETAILED DESCRIPTION

The carbon-13 NMR ($^{13}C$ MAS NMR) spectra were obtained by taking TMS as reference and the fluorine-19 NMR ($^{19}F$ MAS NMR) spectra were obtained by taking $CFCl_3$ as reference.

In the present text, the following terms have the following meanings:

"stack of carbon nanodisks" denotes a mixture of carbon nanodisks and nanocones which have not been subjected to fluorination and which form stacks. These stacks have a thickness of between 10 and 70 nm, preferably have a thickness of 35 nm, and a diameter of between 0.6 and 2.8 µm, preferably a diameter of 1.5 µm, "stack of subfluorinated carbon nanodisks" denotes a stack of carbon nanodisks as defined above after application of the subfluorination process.

This subfluorination process using molecular fluorine $F_2$ is the process described in Zhang et al., "Effect of graphitization on fluorination of carbon nanocones and nanodisks", Carbon, Elsevier, Vol. 47, No. 12, (2009), pages 2763-2775. The stacks underwent an uneven expansion as a result of the application of the process of subfluorination by $F_2$.

However, in the case of the stacks of subfluorinated carbon nanodisks of the invention, although the carbon-comprising precursor (graphitized at 2700° C.) is identical, the expansion is even and the orderliness in the fluorinated parts is better as a result of the application of the subfluorination process with $TbF_4$. The atomic fluorine released by the heating of $TbF_4$ results in the following characteristics: the nanodisks of the invention (denoted C550) exhibit not only a single peak in fluorine-19 NMR ($^{19}F$ MAS NMR) spectrometry but also a paramagnetic resonance spectrum comprising 7 signals between 3200 and 3800 G, as shown respectively in FIGS. 13 and 14. The nanodisks used in the invention thus differ from those which have been described in this paper obtained with $F_2$ (denoted D-500). Furthermore, in contrast to the nanodisks described in this paper, the subfluorinated carbon nanodisks according to the invention exhibit a capacity, when used as electrode, which is greater than the theoretical capacity, as shown in example 3.

Figure 17:
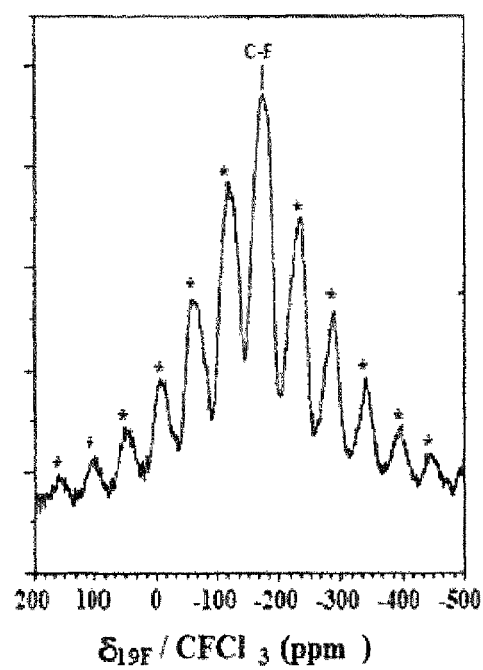
FIG. 17 shows the $^{19}F$ MAS NMR spectrum of double-walled nanotubes according to the invention having the composition $CF_{0.37}$.
Figure 18:
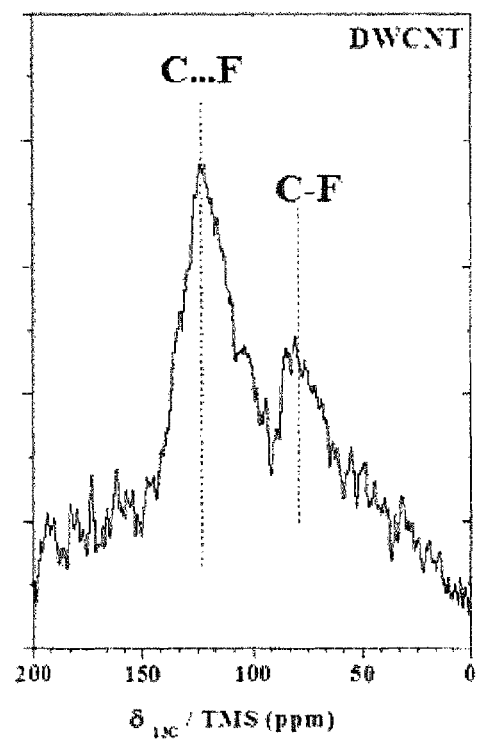
FIG. 18 represents the $^{13}C$ MAS NMR spectrum of double-walled nanotubes according to the invention having the composition $CF_{0.37}$, the $^{19}F$ MAS NMR spectrum of which is represented in FIG. 17.

The expansion of these stacks of nanodisks due to the application of the subfluorination process means that they have a thickness of between 12 and 123 nm, preferably a thickness of 62 nm, and a diameter of between 0.6 and 2.8 µm, preferably a diameter of 1.5 µm, "double-walled carbon nanotubes" denotes carbon nanotubes which have not been subjected to the fluorination process and which have a diameter of between 0.5 and 1.5 nm and a length of between 5 and 20 µm, "double-walled subfluorinated carbon nanotubes" denotes double-walled carbon nanotubes as defined above which have been subjected to the fluorination process described in WO 2007/098478 A2. These subfluorinated carbon nanotubes have a diameter of between 1 and 2.7 nm and a length ranging from 5 to 20 µm. Their $^{19}F$ MAS NMR spectrum exhibits a single peak between −150 and −190 ppm/CFCl$_3$ (rotational bands excluded), related to the covalent C−F bonds, as shown in FIG. 17, and their carbon-13 NMR ($^{13}C$ MAS NMR) spectrum (FIG. 18) exhibits a band at 120 ppm/TMS (rotational bands excluded), which had not been identified in the document WO 2007/098478 A2, in which the NMR spectra of such nanotubes—having less than 30 walls are not presented. Without wishing to be bound by such a theory, the inventors believe that the nanotubes used in the invention having less than 30 walls cannot exhibit an additional peak between −150 ppm/CFCl$_3$ and −190 ppm/CFCl$_3$ (rotational bands excluded) corresponding to a fluorographite structure of $(C_2F)_n$ type as they cannot be graphitized due to their low radii of curvature, which had not been identified in WO 2007/098478 A2.

Figure 15:
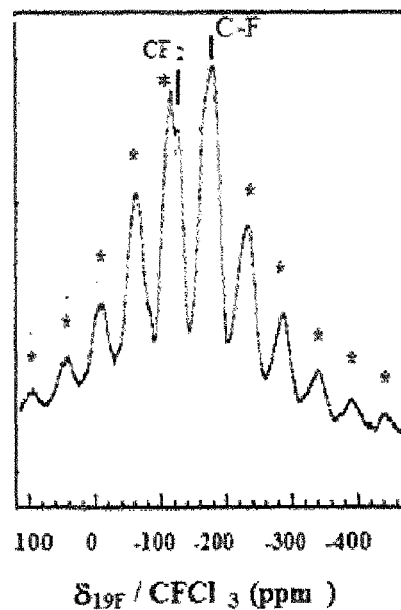
FIG. 15 shows the $^{19}F$ MAS NMR spectrum of few-walled subfluorinated nanotubes (FWCNT) according to the invention having the composition $CF_{0.37}$.

"multi-walled carbon nanotubes" denotes multi-walled carbon nanotubes which have not been subjected to the fluorination process, having a diameter of between 1.5 and 30 nm and a length of between 5 and 20 µm, "multi-walled subfluorinated carbon nanotubes" denotes multi-walled carbon nanotubes as defined above which have been subjected to the fluorination process described in WO 2007/098478 A2. These multi-walled subfluorinated carbon nanotubes have a number of walls of less than 30. They have a diameter of between 1.8 and 54 nm and a length of between 5 and 20 µm. A distinction is made with few-walled carbon nanotubes (FWCNTs). Their $^{19}F$ MAS NMR spectrum exhibits a single peak between −150 and −190 ppm/CFCl$_3$ (rotational bands excluded), related to the covalent C−F bonds, as shown in FIG. 15, and their $^{13}C$ MAS NMR spectrum (FIG. 16) exhibits a peak at 120 ppm/TMS. These characteristics were also not identified in document WO 2007/098478 A2, in which the NMR spectra of these multi-walled nanotubes are not presented.

Figure 19:
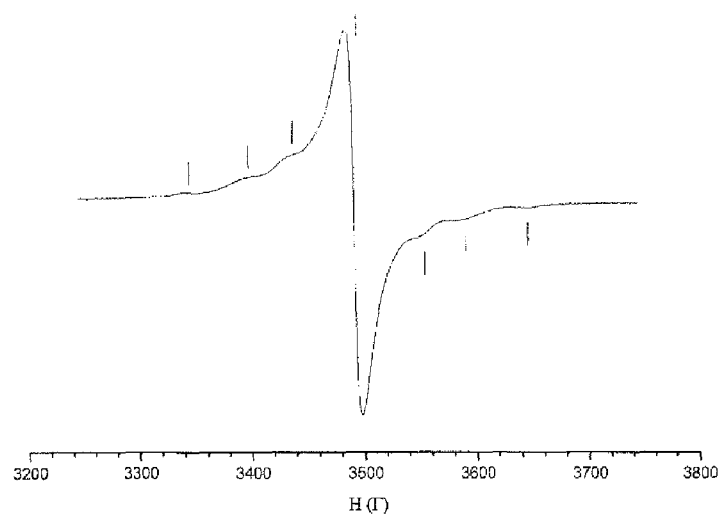
FIG. 19 shows the electron paramagnetic resonance spectrum of micrometric grains according to the invention and having the composition $CF_{0.59}$.
Figure 20:
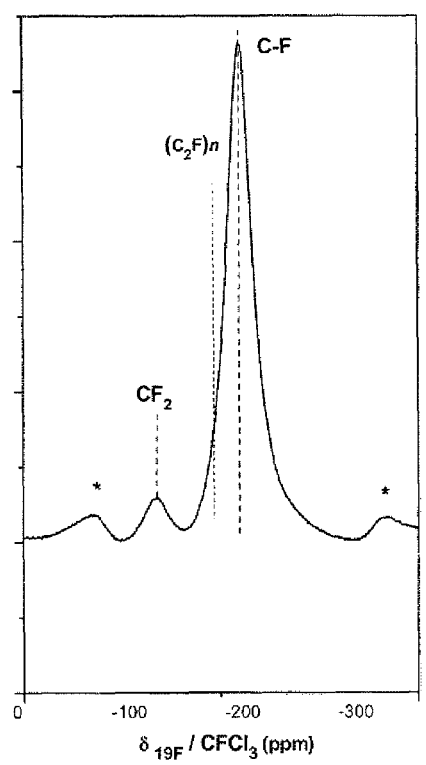
FIG. 20 shows the $^{19}F$ MAS NMR spectrum of micrometric grains used in the invention and having the composition $CF_{0.59}$.

"micrometric grains, the greatest dimension of which is between 1 and 10 µm, made of carbon of graphite crystalline structure" denotes grains made of carbon of graphite crystalline structure which have not been subjected to the fluorination process and which have their greatest dimension of between 1 and 10 µm, "micrometric grains, the greatest dimension of which is between 1 and 10 µm, made of subfluorinated carbon of graphite crystalline structure" denotes grains made of carbon of graphite crystalline structure as defined above which have been subjected to the fluorination process described in Zhang et al., cited above. These grains have their greatest dimension of between 1 and 10 µm. Their $^{19}F$ MAS NMR spectrum exhibits a single peak between −150 and −190 ppm/CFCl$_3$ (rotational bands excluded), related to the covalent C−F bonds, and their electron paramagnetic resonance spectrum exhibits 7 signals between 3200 and 3800 G in the X band, as shown in FIGS. 20 and 19 respectively. The subfluorinated carbon nano-objects used in the invention are represented diagrammatically in FIGS. 1 to 3.

The subfluorinated carbon nano-objects used in the invention have it in common that all comprise a central part made of nonfluorinated carbon and a peripheral part made of fluorinated carbon of formula $CF_x$, where x represents the C/F atomic ratio of between 0.25 and 1.1 exclusive. This central part acts as reinforcement for the subfluorinated carbon nano-objects used in the invention.

They also have it in common of all exhibiting a $^{19}F$ MAS NMR spectrum exhibiting a single peak between −150 and −190 ppm/CFCl$_3$ (rotational bands excluded), related to the covalent C−F bonds, which had never been noted in the prior art. The $^{19}F$ MAS NMR spectra of the nano-objects described in WO 2007/098478 A2 (FIG. 3), WO 2007/126436 A2 (FIG. 9a), US 2007/231696 (FIG. 9), Yasser Ahmad et al., "The synthesis of multilayer graphene materials by the fluorination of carbon nanodiscs/nanocores", Carbon, Vol. 50, No. 10, 9 Apr. 2012 (2012-04-09), pages 3897-3908 (FIG. 5), and Zhang et al., cited above (FIG. 3), all exhibit 2 peaks between −150 and 190 ppm/CFCl$_3$ (rotational bands excluded).

Figure 12:
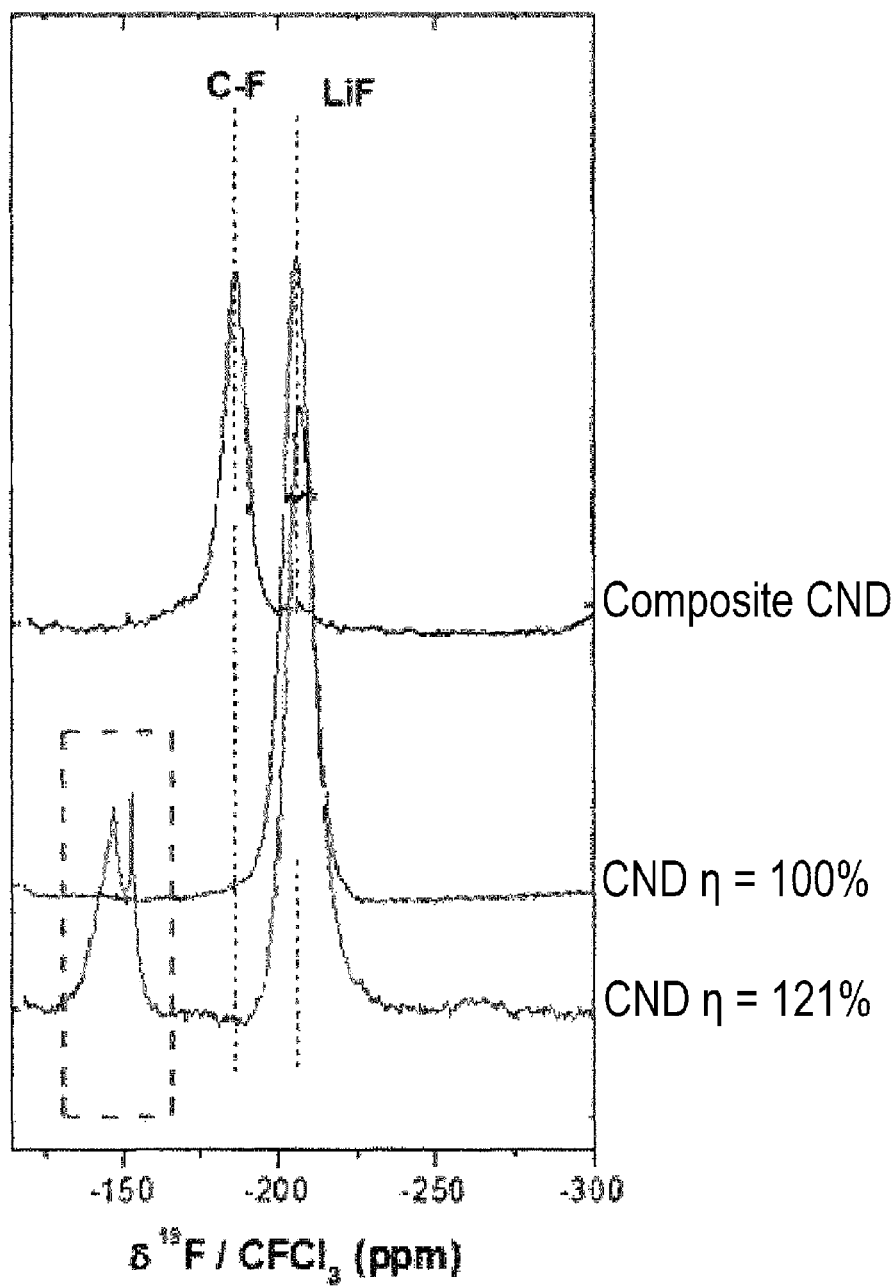
FIG. 12 shows the $^{19}F$ MAS NMR spectra of subfluorinated carbon nanodisks having the composition $CF_{0.80}$ formulated in a composite electrode, before discharge, discharged exactly at the theoretical capacity (788 mAh/g) and with a capacity greater than $C_{theoretical}$, i.e. 955 mAh/g (from top to bottom)

Furthermore, all, after use in a lithium battery, exhibit an additional peak at approximately −175 ppm in their $^{19}F$ MAS NMR spectrum, related to the Li$_2$F$^+$ entities inserted (FIG. 12).

This makes it possible, after manufacturing a batch of such nano-objects, to confirm on a sample that the desired NMR characteristics before and after use are indeed present and that, thus, the batch of nano-objects can be used to obtain an electrode having a greater capacity than the theoretical capacity of the nanoobject.

Figure 1:
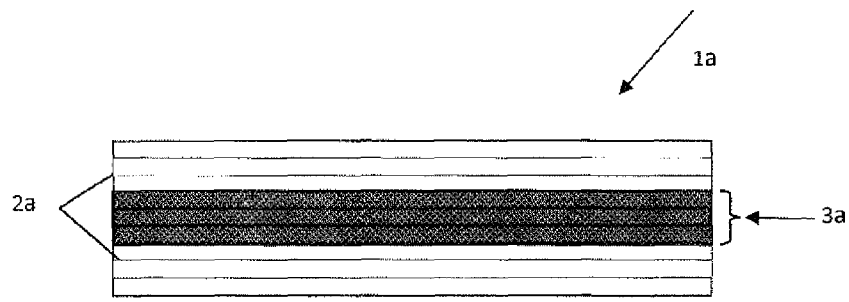
FIG. 1 is an enlarged diagrammatic representation of a view in cross section of a stack of subfluorinated carbon nanodisks used in the invention.

The first category of subfluorinated carbon nano-objects used in the invention is represented diagrammatically, in section, in FIG. 1.

It is a stack, denoted 1a in FIG. 1, of nanodisks.

The central nanodisks, denoted 3a in FIG. 1, of this stack 1a are composed solely of nonfluorinated carbon.

The nanodisks, denoted 2a in FIG. 1, located under and above the nanodisks 3a are for their part made of subfluorinated carbon.

Although, in FIG. 1, the nanodisks 2a are represented as made entirely of nonfluorinated carbon, they may be made of subfluorinated carbon solely on the outer edges.

This is because these subfluorinated carbon nanodisks were obtained by fluorination with a solid fluorinating agent (TbF$_4$) in a reactor by heating commercial carbon nanodisks at temperatures of between 480 and 520° C. The content of total fluorine injected into the reactor was calculated so that the F/C atomic ratio is between 0.20 and 0.95.

It concerns in reality a mixture of carbon nanodisks and carbon nanocones as commercial carbon "nanodisks" are delivered as a mixture with nanocones (70/20/10% by weight, with respect to the total weight, for the disks, cones and amorphous carbons respectively).

Stacks 1a of subfluorinated carbon nanodisks with a thickness of between 12 and 123 nm and with a diameter of between 0.6 and 2.8 µm are obtained by this method of synthesis. Preferably, this total stack of nanodisks has a thickness of 62 nm for a diameter of 1.5 µm. The increase in the thickness is related to an expansion due to the incorporation of the fluorine atoms between the carbon-comprising sheets. The diameter of the nanodisks varies little during the fluorination.

The central nanodisks 3a are made of nonfluorinated carbon and represent from 6 to 14% by volume, with respect to the total volume of the stack 1a of nanodisks.

Figure 14:
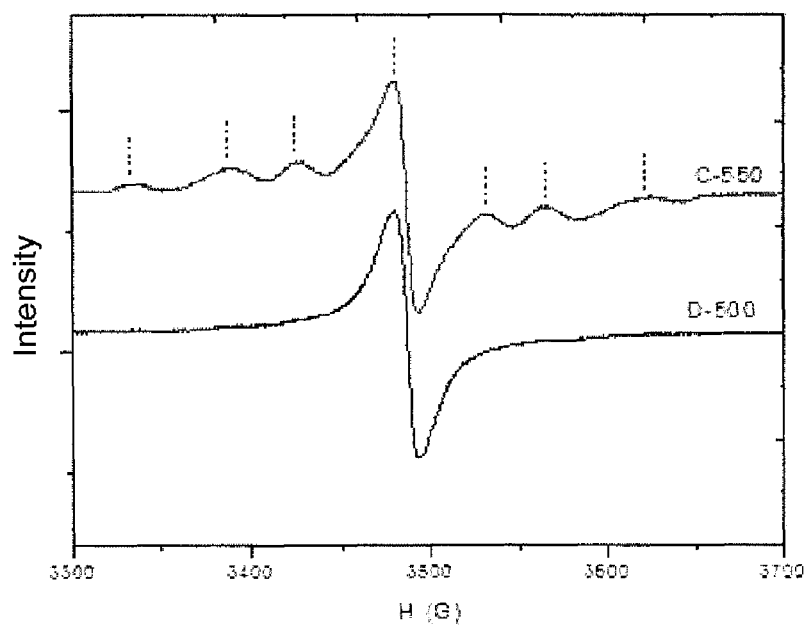
FIG. 14 shows the electron paramagnetic resonance spectrum of nanodisks according to the invention (denoted C550) and having the composition $CF_{0.96}$ and the electron paramagnetic resonance spectrum of the pure graphite (denoted D500 having the composition $CF_{0.96}$)

The electron paramagnetic resonance (EPR) spectrum exhibits 7 signals between 3200 and 3800 G in the X band (FIG. 14).

These combined characteristics make it possible to obtain subfluorinated carbon nanodisks which make it possible to obtain, when they are used as electrode, an electrode having a greater capacity than the theoretical capacity, as is shown in example 2.

It should be noted that the nanodisks described in Zhang et al., "Effect of graphitization on fluorination of carbon nanocones and nanodisks", Carbon, Elsevier, Oxford, GB, Vol. 47, No. 12, (2009), pages 2763-2775, cited above, do not exhibit an electron paramagnetic resonance spectrum having 7 signals between 3200 and 3800 G, as is seen in FIG. 14 of this document.

Furthermore, the nanodisks studied in this document do not have a greater capacity than their theoretical capacity, when they are used as electrode.

The nano-objects used in the invention can also be double-walled subfluorinated carbon nanotubes.

Figure 2:
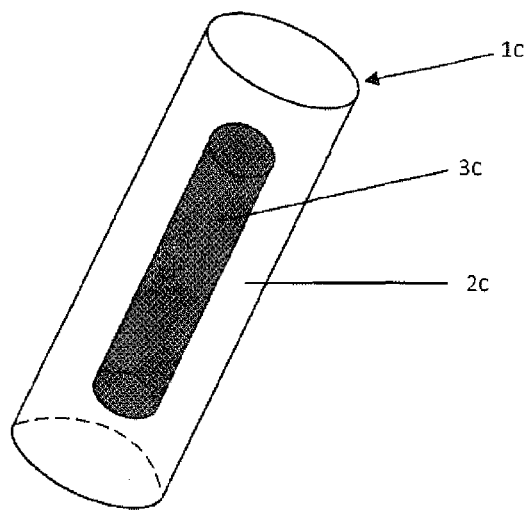
FIG. 2 is an enlarged diagrammatic representation of a view in cross section of a double-walled subfluorinated carbon nanotube used in the invention.

Such double-walled subfluorinated carbon nanotubes are represented diagrammatically, in section, in FIG. 2.

These subfluorinated carbon nanotubes have a diameter of between 1 and 2.7 nm and a length of between 5 and 20 µm.

Figure 3:
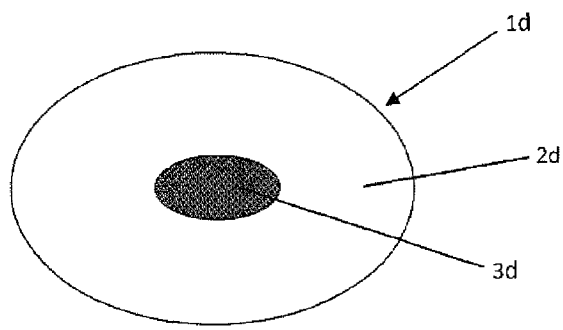
FIG. 3 is an enlarged diagrammatic representation of a view in section of a grain of subfluorinated carbon graphite used in the invention.

These subfluorinated carbon nanotubes comprise a peripheral part, denoted 2c in FIG. 2, made of fluorocarbon of formula $CF_x$, where x represents the F/C atomic ratio and is such that $0.25<x<1.1$, whereas the central tube, denoted 3c in FIG. 3, is made of nonfluorinated carbon.

Thus, the central part 3c of these nonfluorinated carbon nano-objects is the central tube.

These double-walled subfluorinated carbon nanotubes were obtained by direct fluorination of double-walled carbon nanotubes with pure $F_2$ gas, as described in WO 2007/098478 A2.

The reaction temperature was between 250 and 350° C. and the reaction time was 3 hours.

The fluorine gas was in flow form in a Monel reactor comprising double-walled nonfluorinated carbon nanotubes.

The content of total fluorine injected was such that the F/C atomic ratio is between 0.20 and 0.60.

The nano-objects used in the invention can also be multi-walled subfluorinated carbon nanotubes with a number of walls limited to 30.

They were obtained by direct fluorination of multi-walled carbon nanotubes with pure $F_2$ gas, as described in WO 2007/098478 A2. The F/C ratio used for the fluorination of these multi-walled carbon nanotubes was between 0.20 and 0.80.

These multi-walled subfluorinated carbon nanotubes also comprise an external portion made of fluorinated carbon, the F/C atomic ratio of which is between 0.25 and 1.1 exclusive.

In the multi-walled subfluorinated carbon nanotubes used in the invention, only the central tube is intact.

The double-walled or multi-walled subfluorinated carbon nanotubes used in the invention furthermore exhibit a band at 120 ppm/TMS in their $^{13}C$ MAS NMR spectrum (rotational bands excluded).

The reaction temperature was between 300 and 400° C. and the reaction time was 3 hours.

Finally, the nano-objects used in the invention can be micrometric grains of subfluorinated graphite as represented in FIG. 3.

These micrometric grains have their greatest dimension of between 1 and 10 µm.

They comprise a central part, denoted 3d in FIG. 3, made of nonfluorinated carbon and a peripheral part, denoted 2d in FIG. 3.

The peripheral part 2d has an F/C atomic ratio of between 0.25 and 1.1, limits excluded.

Figure 4:
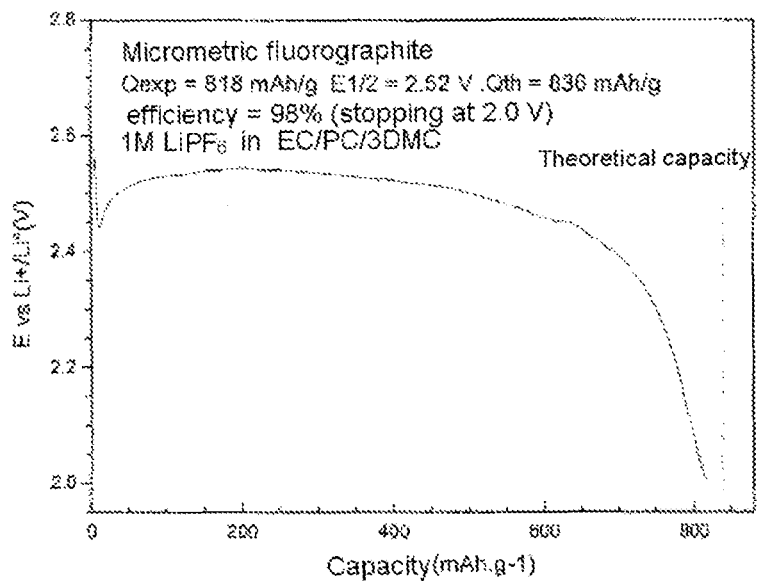
FIG. 4 represents the galvanostatic discharge curve at 10 mA/g (C/100) of a commercial fluorographite cathode having the composition $CF_{0.92}$ (EC/PC/3DMC-1M $LiPF_6$ electrolyte)

The central part 3d made of nonfluorinated carbon represents from 0.8 to 30% by volume of the total volume of the subfluorinated carbon grain, denoted 1d in FIG. 4.

These grains were obtained by rapid fluorination at high temperature (500 to 600° C.) of carbon grains of graphite structure for a few minutes to a few tens of minutes.

The rapid fluorination is carried out at high temperature (500-600° C.) with molecular fluorine $F_2$ in gaseous form added for a short time, of between 20 minutes and 120 minutes, as described in Zhang et al., cited above.

This rapid fluorination is carried out in a passivated nickel reactor of variable volume comprising nonfluorinated carbon grains of graphite structure. The conditions depend on the volume of the oven and on the amount of carbon.

The content of fluorine x in $CF_x$ introduced was calculated, for this rapid fluorination, in order to be between 0.20 and 0.80, limits included.

The subfluorinated carbon grains used in the invention exhibit 7 signals between 3200 and 3800 G in the X band in their electron paramagnetic resonance spectrum (FIG. 19).

The nano-objects used in the invention can also be a mixture of two or more of the nano-objects described above, that is to say of nanodisks, of nanospheres, of double- or multi-walled nanotubes and of micrometric grains, made of subfluorinated carbon.

The electrode obtained by the use of these nano-objects is also a subject matter of the invention.

These electrodes have, surprisingly, an excess capacity, expressed as Faraday efficiency (100% for the theoretical capacity), when incorporated in a primary lithium battery, of 125 to 140% for an electrode composed of nanodisks, of 114% for an electrode composed of carbon nanospheres, of 170% for double-walled or multi-walled nanotubes and of 109% for electrodes composed of graphite microspheres.

It should be noted that, when subfluorinated carbon nanofibers or multi-walled subfluorinated carbon nanotubes with a diameter of greater than or equal to 150 nm are used to manufacture electrodes, no significant excess capacity was recorded.

Thus, the invention also relates to a lithium battery electrode, characterized in that it comprises subfluorinated carbon nano-objects as described above.

It also relates to a lithium battery comprising such an electrode or to an electrode obtained by the use of these nano-objects.

In order for the invention to be better understood, several embodiments will now be described as purely illustrative and nonlimiting examples.

Comparative Example 1

A commercial fluorographite exhibiting micrometric grains having the composition $CF_{0.92}$ is used to form an electrode which is placed in a lithium battery.

The electrode is tested in galvanostatic discharge with a current density of 10 mA/g (C/100) with an EC/PC/3DMC-1M $LiPF_6$ electrolyte.

In order to promote the kinetics of diffusion of the lithium ions and thus to evaluate as best as possible the performance of this electrode (cathode) in terms of capacity, low current densities were applied (C/100).

The curve obtained is represented in FIG. 4.

As seen in FIG. 4, the measured capacity of this electrode is equal to 818 mAh/g (with a stopping potential of 2 V) for a theoretical value of 836 mAh/g, i.e. a Faraday efficiency of 98%.

Figure 10:
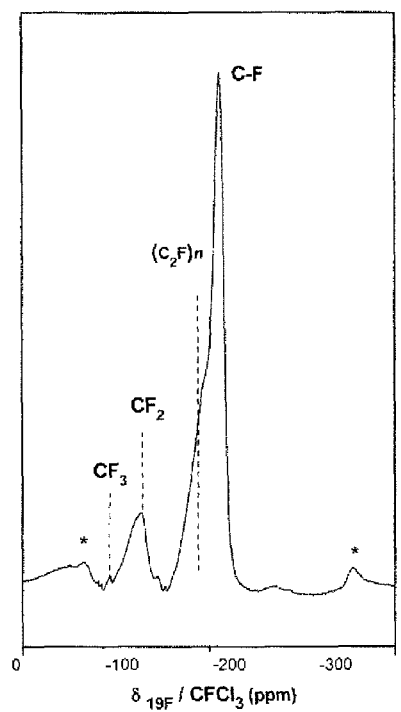
FIG. 10 shows the $^{19}F$ MAS NMR spectrum of a micrometric grain made of commercial graphite fluoride having the composition $CF_{0.92}$.

As is seen in FIG. 10, this commercial fluorographite having the composition $CF_{0.92}$ exhibits 2 peaks in fluorine-19 (MAS) NMR at −190 and −175 ppm/$CFCl_3$ (rotational bands excluded), in contrast to the products of the invention.

Figure 11:
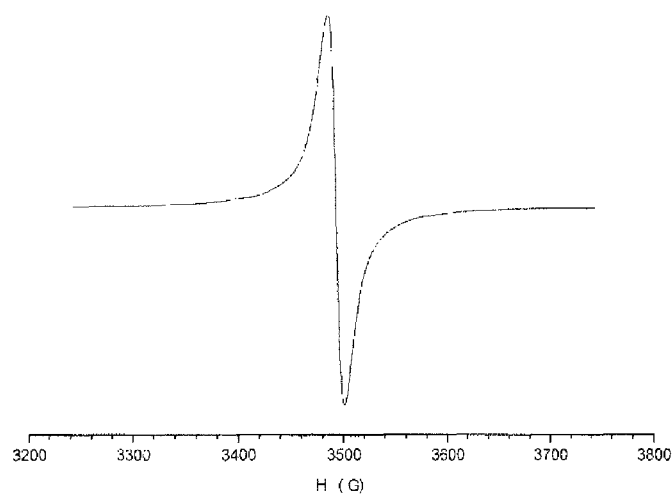
FIG. 11 shows the electron paramagnetic resonance spectrum of a micrometric grain made of commercial graphite fluoride having the composition $CF_{0.92}$.

FIG. 11 shows that the electron paramagnetic resonance spectrum of the commercial fluorographite having the composition $CF_{0.92}$ exhibits only a single signal between 3200 and 3800 G in the X band.

Figure 21:
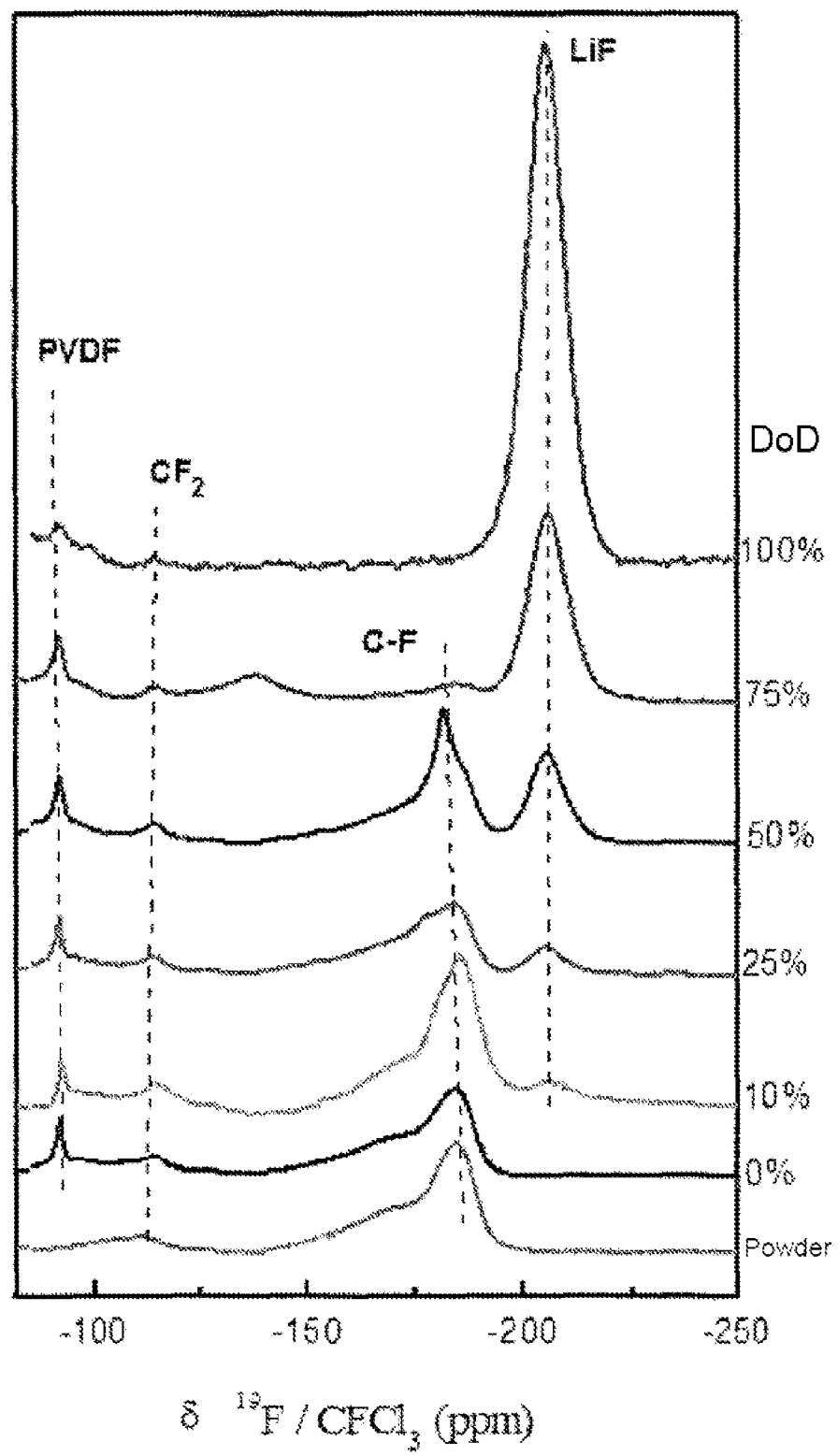
FIG. 21 shows the $^{19}F$ MAS NMR spectra of a composite electrode including a commercial fluorographite having the composition $CF_{0.92}$ as a function of the depth of electrochemical discharge (DoD of 0 to 100%, corresponding to capacities of zero and of 818 mAh/g respectively).

As is shown in FIG. 21, on conclusion of discharge at the maximum capacity of 818 mAh/g, the $^{19}F$ MAS NMR spectrum does not exhibit the peak at −150 ppm/$CFCl_3$ due to the theoretical capacity not being exceeded.

Example 2

Micrometric subfluorinated carbon grains obtained by flash fluorination according to the invention were used here. The chemical composition is $CF_{0.59}$.

In this case, the fluorinated carbon regions are located on the periphery of the grain.

FIG. 19 shows the electron paramagnetic resonance spectrum of the micrometric grains used. It is seen, in FIG. 19, that this electron paramagnetic resonance spectrum exhibits 7 signals between 3200 and 3800 G, whereas the electron paramagnetic resonance spectrum of a micrometric grain made of commercial fluorographite having the composition $CF_{0.92}$ comprises only one signal, as shown in FIG. 11.

FIG. 20 shows the $^{19}F$ MAS NMR spectrum of the micrometric grains used in the invention. It is seen, in FIG. 20, that this spectrum comprises a single peak between −150 and 190 ppm/$CFCl_3$ (rotational bands excluded), whereas the $^{19}F$ MAS NMR spectrum of a commercial micrometric graphite fluoride grain $CF_{0.92}$, represented in FIG. 10, exhibits an addition thereto; it shows the presence of a $(C_2F)_n$ phase.

Figure 5:
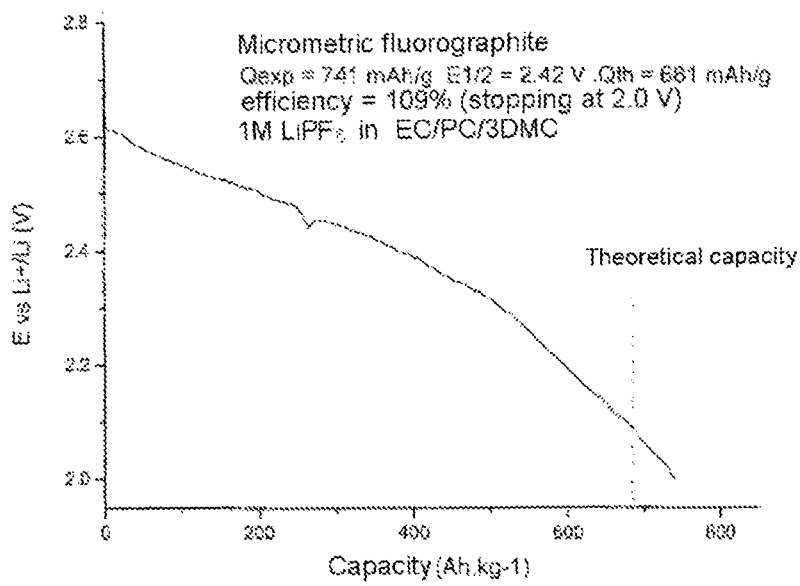
FIG. 5 represents the galvanostatic discharge curve at 10 mA/g (C/70) of micrometric grains of subfluorinated carbon graphite having the composition $CF_{0.59}$ according to the invention (EC/PC/3DMC-1M $LiPF_6$ electrolyte)

When these grains were used to form a lithium battery cathode, which was tested in galvanostatic discharge at 10 mA/g (C/100) with an ethylene carbonate/propylene carbonate/3 dimethyl carbonate (EC/PC/3DMC)–1M $LiPF_6$ electrolyte, the curve represented in FIG. 5 is obtained.

As is seen from FIG. 5, the capacity is 741 mAh/g, i.e. an excess capacity of 109%, the theoretical capacity being 681 mAh/g.

Example 3

In this instance, it is subfluorinated carbon nanodisks according to the invention which were used.

These nano-objects comprised a mixture of nanodisks (70% by weight) and nanocones (20% by weight) (the remaining 10% by weight are amorphous carbons).

The composition of these nanodisks and these nanocones in their fluorinated part was $CF_{0.80}$.

Figure 13:
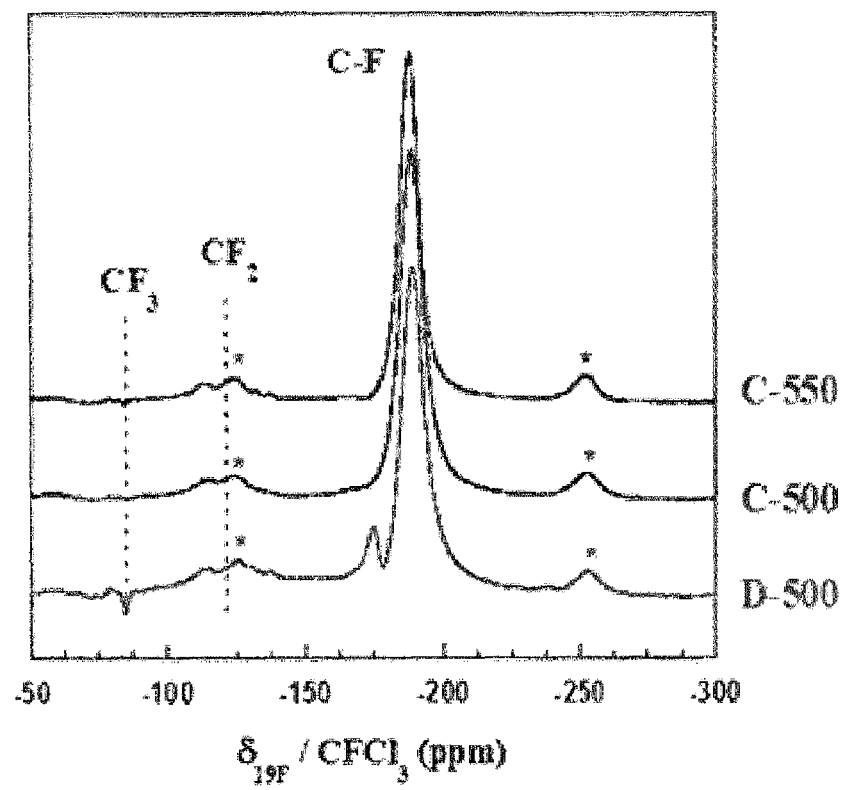
FIG. 13 shows the $^{19}F$ MAS NMR spectrum of nanodisks fluorinated with $F_2$ (denoted D500) having the composition $CF_{0.96}$ and of nanodisks according to the invention fluorinated with $TbF_4$ (denoted C500 and C550) having the composition $CF_{0.70}$ and $CF_{0.95}$ respectively.

FIG. 13 shows the $^{19}F$ MAS NMR spectrum of these nanodisks, which are denoted C550 and C500 in FIG. 13.

The presence of a single peak between −150 and −190 ppm/$CFCl_3$ is noted in this spectrum (rotational bands excluded).

FIG. 13 also shows the $^{19}F$ MAS NMR spectrum of nanodisks fluorinated with pure $F_2$ gas (denoted D500).

The presence of an additional peak is observed in the $^{19}F$ MAS NMR spectrum.

FIG. 14 shows the electron paramagnetic resonance spectrum of these nanodisks (denoted 550).

The presence of 7 peaks between −3300 and −3400 G is seen in this spectrum.

FIG. 14 also shows the electron paramagnetic resonance spectrum of the pure graphite (denoted D500).

It is noted that, in this case, there is only a single signal in this spectrum.

These nano-objects were used to form an electrode which was used as cathode of a lithium battery using an EC/PC/3DMC-1M $LiPF_6$ electrolyte.

Figure 6:
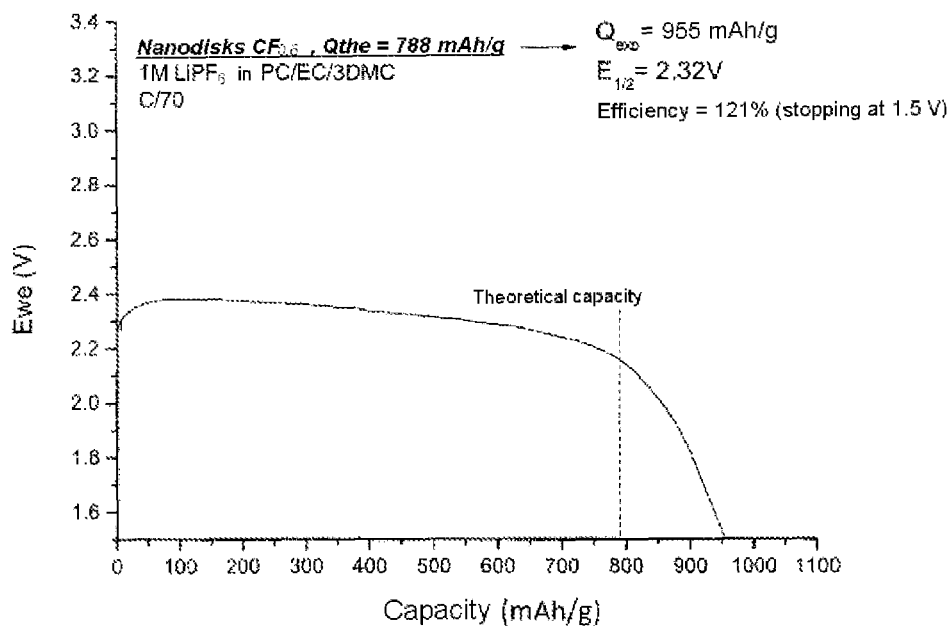
FIG. 6 represents the galvanostatic discharge curve at 10 mA/g of subfluorinated carbon nanodisks having the composition $CF_{0.80}$ according to the invention (EC/PC/3DMC-1M $LiPF_6$ electrolyte)

The galvanostatic discharge curve at 10 mA/g of these nano-objects is shown in FIG. 6.

The value of the capacity obtained is 955 mAh/g, as is seen in FIG. 6, which represents an excess capacity of 121% (theory: 788 mAh/g).

As is shown in FIG. 12, the $^{19}F$ NMR spectrum of these nanodisks, after use in a battery and obtaining the extra capacity, exhibits an additional peak at −150 ppm/$CFCl_3$.

Example 4

In this instance, it is subfluorinated carbon nanodisks according to the invention which were used.

These nano-objects comprised a mixture of nanodisks and nanocones.

The composition of these nanodisks and these nanocones in their fluorinated part corresponded to the formula $CF_{0.95}$.

These nano-objects were used to form an electrode which was used as cathode of a lithium battery using a PC-1M $LiClO_4$ electrolyte.

Figure 7:
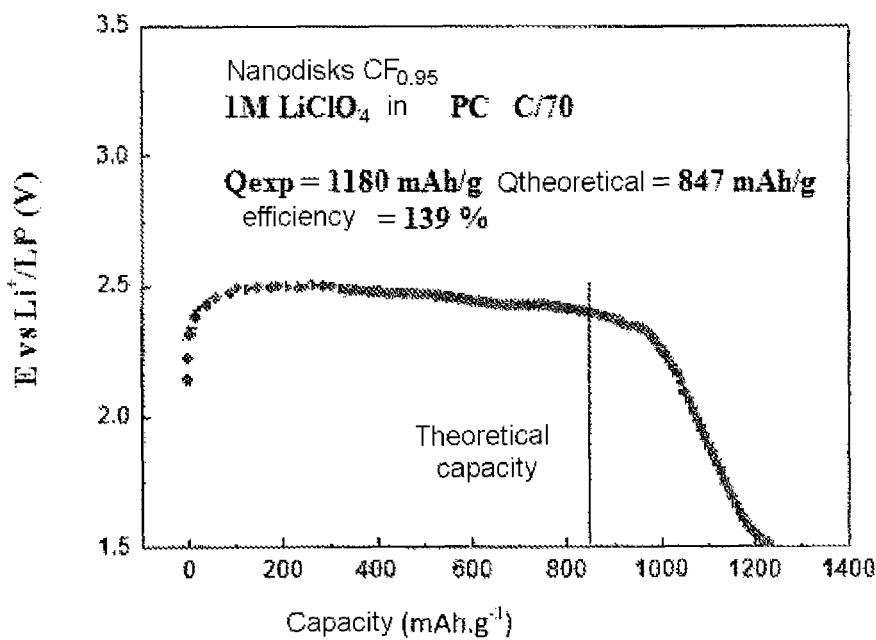
FIG. 7 represents the galvanostatic discharge curve at 10 mA/g of subfluorinated carbon nanodisks having the composition $CF_{0.95}$ according to the invention (PC-1M $LiClO_4$ electrolyte)
Figure 8:
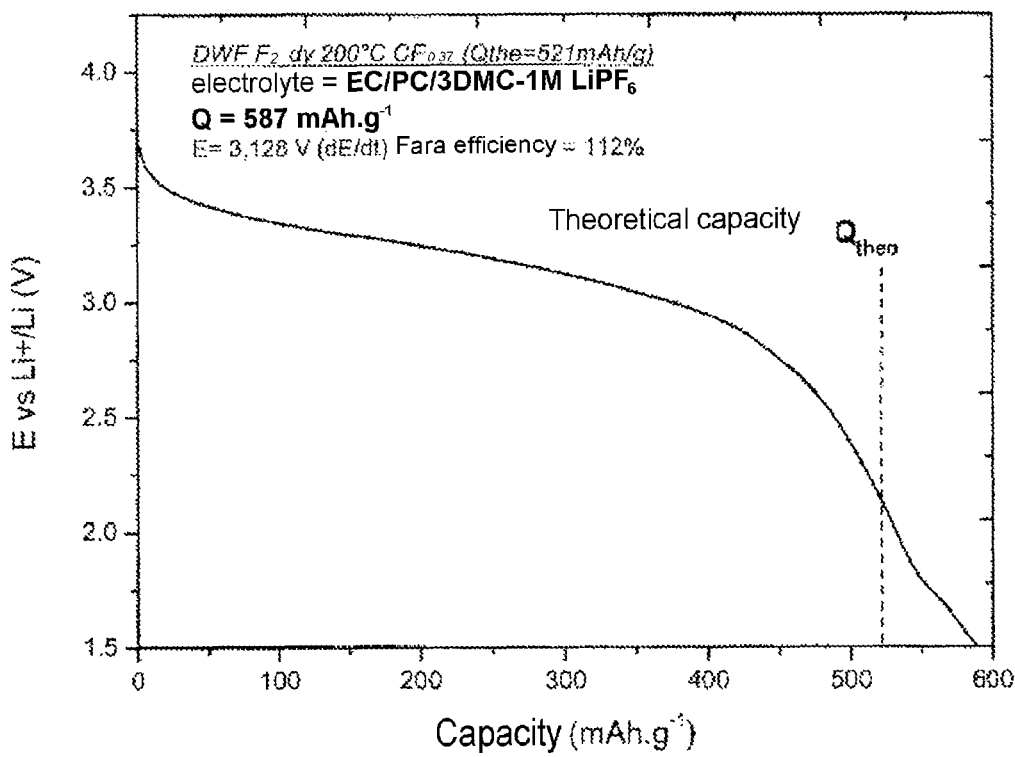
FIG. 8 represents the galvanostatic discharge curve at 10 mA/g (C/70) of double-walled subfluorinated carbon nanotubes (DWCNT) according to the invention.

The galvanostatic discharge curve at 10 mA/g of these nano-objects is shown in FIG. 7.

The value of the capacity obtained is 1180 mAh/g, as is seen in FIG. 7, which represents an extra capacity of 39% (847 mAh/g in theory).

Example 5

The nano-objects used in this example are few-walled subfluorinated carbon nanotubes (FWCNT) according to the invention.

FIG. 15 shows the $^{19}F$ NMR spectrum of these nanotubes.

The presence is noted of a single isotropic peak between −150 and −190 ppm/$CFCl_3$ (rotational bands excluded), related to the covalent C—F bonds.

Figure 16:
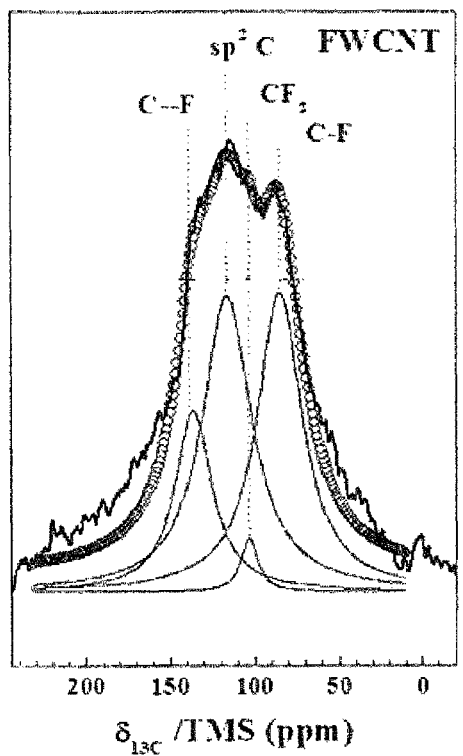
FIG. 16 shows the $^{13}C$ MAS NMR spectrum of few-walled subfluorinated nanotubes (FWCNT) according to the invention and having the composition $CF_{0.37}$, the $^{19}F$ NMR spectrum of which is shown in FIG. 15.

FIG. 16 represents the $^{13}C$ MAS NMR spectrum of these nanotubes.

The presence is noted of a band at 120 ppm/TMS (rotational bands excluded).

These nanotubes were used to form an electrode. For this, 80% by weight of these nanotubes were mixed with 10% by weight of PVDF and 10% by weight of carbon with respect to the total weight of the electrode formed.

Thus, it is seen from the above that the nano-objects of the invention are nano-objects which had never been described previously and which, surprisingly, make it possible to obtain an electrode which, when used in a lithium battery, makes it possible to obtain a greater capacity than the theoretical capacity of the fluorinated nanoobject.

Figure 9:
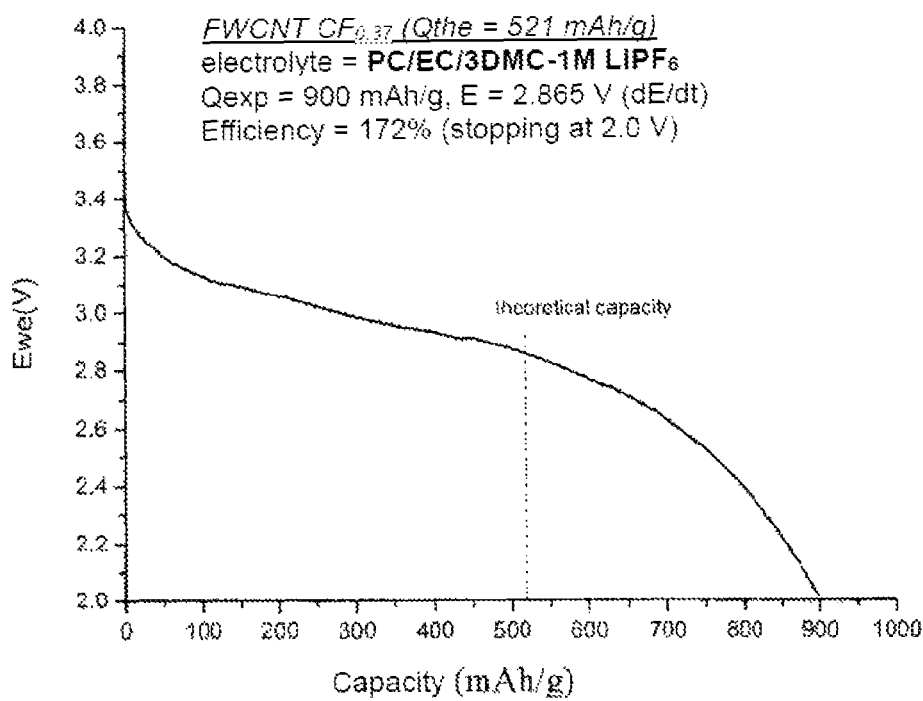
FIG. 9 represents the galvanostatic discharge curve at 10 mA/g (C/70) of few-walled subfluorinated carbon nanotubes (FWCNT) according to the invention.

When used to form an electrode (cathode) of a lithium battery, they exhibit a capacity of 900 mAh/g, i.e. a theoretical excess capacity of 173% (521 mAh/g in theory), as is seen in FIG. 9, which represents the galvanostatic discharge curve at C/70 of these carbon nanotubes.

The electrolyte used was EC/PC/3DMC-1M $LiPF_6$.

The invention claimed is:

1. A process for the manufacture of a lithium battery electrode, said process comprising the formation of a lithium battery electrode with micrometric grains made of subfluorinated carbon with a graphite crystalline structure, the greatest dimension of which is between 1 and 10 μm, said micrometric grains comprising:
  a central part made of nonfluorinated carbon which represents from 0.8 to 30% by volume of the total volume of the grain, and
  a peripheral part made of fluorinated carbon of formula $CF_x$, where x represents the F/C atomic ratio and is such that $0.25<x<1.1$, and the $^{19}F$ MAS NMR spectrum of which exhibits a single isotropic peak between −150 and −190 ppm/$CFCl_3$, rotational bands excluded, and the electron paramagnetic resonance spectrum of which exhibits 7 signals between 3200 and 3800 G in the X band,
the electrode obtained having a capacity greater than 100% of the theoretical capacity of the micrometric grain.

2. The process as claimed in claim 1, in which the formation of a lithium battery electrode with micrometric grains made of subfluorinated carbon is carried out by mixing 80% by weight of these micrometric grains with 20% by weight of a mixture of a binding agent and carbon, with respect to the total weight of the electrode formed.

3. The process as claimed in claim 2, wherein the binding agent is PVDF (polyvinylidene fluoride).

4. The process as claimed in claim 1, in which the formation of a lithium battery electrode with micrometric grains made of subfluorinated carbon is carried out by mixing 80% by weight of these micrometric grains with 10% by weight of PVDF and 10% by weight of carbon, with respect to the total weight of the electrode formed.

5. The process as claimed in claim 1, in which the micrometric grains are as a mixture with one or more nano-objects chosen from:
  a stack of subfluorinated carbon nanodisks with a diameter of between 0.6 and 2.8 μm, preferably with a diameter of 1.5 μm, and with a thickness of between 12 and 123 nm, preferably with a thickness of 62 nm, the central part of which made of nonfluorinated carbon represents from 6 to 14% by volume of the total volume of the stack of nanodisks and the peripheral part of formula CFx, where x represents the F/C atomic ratio and is such that $0.25<x<1.1$ and the electron paramagnetic resonance spectrum of which exhibits 7 signals between 3200 and 3800 G in the X band;
  double-walled subfluorinated carbon nanotubes with a diameter of between 1 and 2.7 nm and with a length of between 5 and 20 μm, the central nanotube of which made of nonfluorinated carbon represents from 45 to 65% by volume, preferably 60% by volume, of the total volume of the nanotubes and the $^{13}C$ MAS NMR spectrum of which exhibits a band at 120 ppm/TMS (tetramethylsilane); and
  multi-walled subfluorinated carbon nanotubes with a diameter of between 1.8 and 54 nm and with a length of between 5 and 20 μm, the central nanotube of which made of nonfluorinated carbon represents from 3 to 60% by volume of the total volume of the multi-walled nanotubes, comprising less than 30 walls, and the $^{13}C$ MAS NMR spectrum of which exhibits a band at 120 ppm/TMS.

6. The process as claimed in claim 2, in which the micrometric grains are as a mixture with one or more nano-objects chosen from:
  a stack of subfluorinated carbon nanodisks with a diameter of between 0.6 and 2.8 μm, preferably with a diameter of 1.5 μm, and with a thickness of between 12 and 123 nm, preferably with a thickness of 62 nm, the central part of which made of nonfluorinated carbon represents from 6 to 14% by volume of the total volume of the stack of nanodisks and the peripheral part of formula CFx, where x represents the F/C atomic ratio and is such that $0.25<x<1.1$ and the electron paramagnetic resonance spectrum of which exhibits 7 signals between 3200 and 3800 G in the X band;
  double-walled subfluorinated carbon nanotubes with a diameter of between 1 and 2.7 nm and with a length of between 5 and 20 μm, the central nanotube of which made of nonfluorinated carbon represents from 45 to 65% by volume, preferably 60% by volume, of the total volume of the nanotubes and the $^{13}C$ MAS NMR spectrum of which exhibits a band at 120 ppm/TMS (tetramethylsilane); and
  multi-walled subfluorinated carbon nanotubes with a diameter of between 1.8 and 54 nm and with a length of between 5 and 20 μm, the central nanotube of which made of nonfluorinated carbon represents from 3 to 60% by volume of the total volume of the multi-walled nanotubes, comprising less than 30 walls, and the $^{13}C$ MAS NMR spectrum of which exhibits a band at 120 ppm/TMS.

7. The process as claimed in claim 3, in which the micrometric grains are as a mixture with one or more nano-objects chosen from:
  a stack of subfluorinated carbon nanodisks with a diameter of between 0.6 and 2.8 μm, preferably with a diameter of 1.5 μm, and with a thickness of between 12 and 123 nm, preferably with a thickness of 62 nm, the central part of which made of nonfluorinated carbon represents from 6 to 14% by volume of the total volume of the stack of nanodisks and the peripheral part of formula CFx, where x represents the F/C atomic ratio and is such that $0.25<x<1.1$ and the electron paramagnetic resonance spectrum of which exhibits 7 signals between 3200 and 3800 G in the X band;
  double-walled subfluorinated carbon nanotubes with a diameter of between 1 and 2.7 nm and with a length of between 5 and 20 μm, the central nanotube of which made of nonfluorinated carbon represents from 45 to 65% by volume, preferably 60% by volume, of the total volume of the nanotubes and the $^{13}C$ MAS NMR spectrum of which exhibits a band at 120 ppm/TMS (tetramethylsilane); and
  multi-walled subfluorinated carbon nanotubes with a diameter of between 1.8 and 54 nm and with a length of between 5 and 20 μm, the central nanotube of which made of nonfluorinated carbon represents from 3 to 60% by volume of the total volume of the multi-walled nanotubes, comprising less than 30 walls, and the $^{13}C$ MAS NMR spectrum of which exhibits a band at 120 ppm/TMS.

8. The process as claimed in claim 4, in which the micrometric grains are as a mixture with one or more nano-objects chosen from:
  a stack of subfluorinated carbon nanodisks with a diameter of between 0.6 and 2.8 μm, preferably with a diameter of 1.5 μm, and with a thickness of between 12 and 123 nm, preferably with a thickness of 62 nm, the central part of which made of nonfluorinated carbon represents from 6 to 14% by volume of the total volume of the stack of nanodisks and the peripheral part of formula CFx, where x represents the F/C atomic ratio and is such that $0.25<x<1.1$ and the electron paramagnetic resonance spectrum of which exhibits 7 signals between 3200 and 3800 G in the X band;

double-walled subfluorinated carbon nanotubes with a diameter of between 1 and 2.7 nm and with a length of between 5 and 20 µm, the central nanotube of which made of nonfluorinated carbon represents from 45 to 65% by volume, preferably 60% by volume, of the total volume of the nanotubes and the $^{13}$C MAS NMR spectrum of which exhibits a band at 120 ppm/TMS (tetramethylsilane); and multi-walled subfluorinated carbon nanotubes with a diameter of between 1.8 and 54 nm and with a length of between 5 and 20 the central nanotube of which made of nonfluorinated carbon represents from 3 to 60% by volume of the total volume of the multi-walled nanotubes, comprising less than 30 walls, and the $^{13}$C MAS NMR spectrum of which exhibits a band at 120 ppm/TMS.

9. A primary lithium battery electrode, wherein it comprises micrometric grains made of subfluorinated carbon with a graphite crystalline structure, the greatest dimension of which is between 1 and 10 said grains comprising:

a central part made of nonfluorinated carbon which represents from 0.8 to 30% by volume of the total volume of the grain, and a peripheral part made of fluorinated carbon of formula $CF_x$, where x represents the F/C atomic ratio and is such that $0.25<x<1.1$, and the $^{19}$F MAS NMR spectrum of which exhibits a single isotropic peak between −150 and −190 ppm/$CFCl_3$, rotational bands excluded, and the electron paramagnetic resonance spectrum of which exhibits 7 signals between 3200 and 3800 G in the X band, the primary battery having a capacity greater than 100% of the theoretical capacity of the micrometric grain.

10. The electrode as claimed in claim 9, in which the micrometric grains are as a mixture with one or more nano-objects chosen from:

a stack of subfluorinated carbon nanodisks with a diameter of between 0.6 and 2.8 µm, preferably with a diameter of 1.5 and with a thickness of between 12 and 123 nm, preferably with a thickness of 62 nm, the central part of which made of nonfluorinated carbon represents from 6 to 14% by volume of the total volume of the stack of nanodisks and the peripheral part of formula CFx, where x represents the F/C atomic ratio and is such that $0.25<x<1.1$ and the electron paramagnetic resonance spectrum of which exhibits 7 signals between 3200 and 3800 G in the X band;

double-walled subfluorinated carbon nanotubes with a diameter of between 1 and 2.7 nm and with a length of between 5 and 20 the central nanotube of which made of nonfluorinated carbon represents from 45 to 65% by volume, preferably 60% by volume, of the total volume of the nanotubes and the $^{13}$C MAS NMR spectrum of which exhibits a band at 120 ppm/TMS (tetramethylsilane); and multi-walled subfluorinated carbon nanotubes with a diameter of between 1.8 and 54 nm and with a length of between 5 and 20 the central nanotube of which made of nonfluorinated carbon represents from 3 to 60% by volume of the total volume of the multi-walled nanotubes, comprising less than 30 walls, and the $^{13}$C MAS NMR spectrum of which exhibits a band at 120 ppm/TMS.

11. A primary lithium battery, wherein it comprises an electrode obtained by a process comprising forming a lithium battery electrode with micrometric grains made of subfluorinated carbon with a graphite crystalline structure, the greatest dimension of which is between 1 and 10 µm, said micrometric grains comprising:

a central part made of nonfluorinated carbon which represents from 0.8 to 30% by volume of the total volume of the grain, and a peripheral part made of fluorinated carbon of formula $CF_x$, where x represents the F/C atomic ratio and is such that $0.25<x<1.1$, and the $^{19}$F MAS NMR spectrum of which exhibits a single isotropic peak between −150 and −190 ppm/$CFCl_3$, rotational bands excluded, and the electron paramagnetic resonance spectrum of which exhibits 7 signals between 3200 and 3800 G in the X band, wherein the electrode obtained having a capacity greater than 100% of the theoretical capacity of the micrometric grain.

12. The primary lithium battery as claimed in claim 11, wherein the forming of the lithium battery electrode with micrometric grains made of subfluorinated carbon is carried out by mixing 80% by weight of these micrometric grains with 20% by weight of a mixture of a binding agent and carbon, with respect to the total weight of the electrode formed.

13. The primary lithium battery as claimed in claim 12, wherein the binding agent is PVDF (polyvinylidene fluoride).

14. The primary lithium battery as claimed in claim 11, wherein the forming of a lithium battery electrode with micrometric grains made of subfluorinated carbon is carried out by mixing 80% by weight of these micrometric grains with 10% by weight of PVDF, and 10% by weight of carbon, with respect to the total weight of the electrode formed.

15. The primary lithium battery as claimed in claim 11, wherein the micrometric grains are as a mixture with one or more nano-objects chosen from:

a stack of subfluorinated carbon nanodisks with a diameter of between 0.6 and 2.8 µm, preferably with a diameter of 1.5 µm, and with a thickness of between 12 and 123 nm, preferably with a thickness of 62 nm, the central part of which made of nonfluorinated carbon represents from 6 to 14% by volume of the total volume of the stack of nanodisks and the peripheral part of formula CFx, where x represents the F/C atomic ratio and is such that $0.25<x<1.1$ and the electron paramagnetic resonance spectrum of which exhibits 7 signals between 3200 and 3800 G in the X band;

double-walled subfluorinated carbon nanotubes with a diameter of between 1 and 2.7 nm and with a length of between 5 and 20 µm, the central nanotube of which made of nonfluorinated carbon represents from 45 to 65% by volume, preferably 60% by volume, of the total volume of the nanotubes and the $^{13}$C MAS NMR spectrum of which exhibits a band at 120 ppm/TMS (tetramethylsilane); and multi-walled subfluorinated carbon nanotubes with a diameter of between 1.8 and 54 nm and with a length of between 5 and 20 µm, the central nanotube of which made of nonfluorinated carbon represents from 3 to 60% by volume of the total volume of the multi-walled nanotubes, comprising less than 30 walls, and the $^{13}$C MAS NMR spectrum of which exhibits a band at 120 ppm/TMS.

16. A primary lithium battery, wherein it comprises an electrode as claimed in claim 9, and an electrolyte.

17. A primary lithium battery, wherein it comprises an electrode as claimed in claim 10, and an electrolyte.

* * * * *